(12) United States Patent
Kwon et al.

(10) Patent No.: US 8,789,515 B2
(45) Date of Patent: Jul. 29, 2014

(54) RESERVOIR FOR FUEL TANK

(75) Inventors: Kusung Kwon, Daejeon (KR); Chanheum Yoon, Yeongi-gun (KR)

(73) Assignee: Coavis, Chungcheongnam-do (KR)

( * ) Notice: Subject to any disclaimer, the term of this patent is extended or adjusted under 35 U.S.C. 154(b) by 250 days.

(21) Appl. No.: 13/337,204

(22) Filed: Dec. 26, 2011

(65) Prior Publication Data

US 2013/0000608 A1 Jan. 3, 2013

(30) Foreign Application Priority Data

Dec. 30, 2010 (KR) .................. 10-2010-0138412

(51) Int. Cl.
*F02M 37/02* (2006.01)
*F02M 37/00* (2006.01)

(52) U.S. Cl.
USPC ........................................... 123/509

(58) Field of Classification Search
USPC .................. 123/509, 495, 514; 417/201, 313; 220/694
See application file for complete search history.

(56) References Cited

U.S. PATENT DOCUMENTS

| | | | | |
|---|---|---|---|---|
| 4,541,395 A | * | 9/1985 | Geiger ........................ | 123/514 |
| 5,253,628 A | * | 10/1993 | Brown ........................ | 123/516 |
| 5,360,322 A | * | 11/1994 | Henein et al. ............... | 417/313 |
| 5,560,342 A | * | 10/1996 | Fournier et al. ............. | 123/509 |
| 5,699,773 A | * | 12/1997 | Kleppner et al. ............ | 123/510 |
| 5,881,699 A | * | 3/1999 | Brown et al. ............... | 123/514 |
| 6,805,538 B2 | * | 10/2004 | Djordjevic ................... | 417/201 |
| 7,117,855 B1 | | 10/2006 | Kuehnemund et al. | |
| 7,350,509 B2 | * | 4/2008 | Barz et al. ................... | 123/509 |
| 2008/0196780 A1 | * | 8/2008 | Tipton et al. ................ | 137/861 |

FOREIGN PATENT DOCUMENTS

| | | |
|---|---|---|
| KR | 2019980051567 U | 10/1998 |
| KR | 1020040086229 A | 10/2004 |
| KR | 100993574 B1 | 11/2010 |

* cited by examiner

*Primary Examiner* — Mahmoud Gimie
(74) *Attorney, Agent, or Firm* — The Webb Law Firm

(57) ABSTRACT

Provided is a reservoir for a fuel tank not including a pump and capable of allowing fuel to be smoothly transferred by effectively blocking a solidification material when solidification occurs in the fuel in a low temperature environment.

8 Claims, 4 Drawing Sheets

(A)

(B)

(C)

(D)

RESERVOIR FOR FUEL TANK

CROSS-REFERENCE TO RELATED APPLICATIONS

This application claims priority under 35 U.S.C. §119 to Korean Patent Application No. 2010-0138412, filed on Dec. 30, 2010, in the Korean Intellectual Property Office, the disclosure of which is incorporated herein by reference in its entirety.

TECHNICAL FIELD

The present invention relates to a reservoir for a fuel tank.

Fuel should be continuously and stably supplied from a fuel tank of a vehicle to an engine. Therefore, a number of technologies for allowing fuel to be smoothly and stably supplied to an engine by a desired amount have been disclosed. Particularly, in the case in which a driving condition is not a general driving condition, that is, in the case in which the driving condition is not a condition in which fuel is appropriately filled in a fuel tank and a vehicle itself is being driven, a technology of allowing the fuel to be smoothly and stably supplied as described above is very important. Particularly, in the case in which the vehicle has just started or the fuel is not sufficiently filled in the fuel tank, it is difficult to smoothly supply the fuel to the engine only with a fuel supply structure in the general driving condition. Therefore, the fuel tank is generally provided with a reservoir, which is a structure allowing the fuel to be smoothly supplied in this case.

The reservoir, which has a form of a small fuel receiver provided in a fuel supply pipe connected to a fuel tank, is designed to always receive a predetermined amount or more of fuel regardless of an amount of fuel received in the fuel tank. Therefore, even in the case in which the amount of the fuel received in the fuel tank is significantly small or a fuel surface in the fuel tank becomes an abnormal state such as a case in which the vehicle is driven on a steep road for a long period of time, or the like, the fuel may be stably supplied to the engine by the reservoir.

BACKGROUND

FIG. 1 schematically shows a structure of a reservoir according to the related art. Generally, the reservoir 100' is provided in a fuel tank 300' and is basically configured to include: a receiving part 110' having a fuel sucking pipe 120' connected thereto and receiving fuel, the fuel sucking pipe 120' supplying the fuel to an engine 200'; a supplying part 130' connected to the receiving part 110' to supply the fuel in the fuel tank 300' into the receiving part 110'; and a measuring part 140' measuring an amount of the fuel received in the receiving part 110'. As a reservoir having a more advanced form, there is a reservoir further including a pump actively sucking up the fuel in the receiving part 110' to transfer the fuel to the engine 200'. However, the reservoir not including the pump will be described below. In the case of the reservoir not including the pump, the fuel is relatively less stably transferred to the engine as compared to the reservoir including the pump. However, since the reservoir not including the pump has a significantly simple structure, a manufacturing cost is cheap, a fault generation rate is significantly reduced, such that a lifespan is long, and maintenance is convenient. Due to these advantages, the reservoir not including the pump has still been mainly used in a diesel vehicle, or the like.

The supplying part 130' has a form of a jet pump. The number of jet pumps may be one or more according to a form, a structure, and the like, of the fuel tank 300'. The measuring part 140' generally has a form of a float, which is one of the simplest structures measuring a water level. In addition, although not shown, the reservoir 100' is also provided with a structure to which a return fuel discharging pipe discharging fuel returned from the engine 300' into the receiving part 110' of the reservoir 100' is connected, in addition the above-mentioned components.

Meanwhile, fuel used in the vehicle is generally divided mainly into diesel and gasoline. Since the gasoline is generally commercialized in a state in which it is appropriately filtered, the gasoline hardly include foreign materials mixed therewith, such that a specific problem is not generated. However, in the case of the diesel, the ratio of the foreign materials mixed is relatively higher as compared to the gasoline. In addition, the diesel is solidified at a more rapid speed as compared to the gasoline, due to characteristics thereof, as a temperature decreases. Further, since the diesel contains relatively more moisture due to characteristics of a production process thereof, the diesel may also include a lump generated due to the freezing of the moisture in the fuel particularly in a low temperature environment.

Generally, the diesel becomes a slush state at a temperature of about −20° C. and is frozen at a temperature of about −24 to −25° C., and bio diesel starts to be frozen at a temperature higher than −24 to −25° C. Therefore, in a diesel vehicle in which the ratio of using the reservoir not including the pump is high, the lump generated due to the freezing of the diesel or the moisture in the diesel as described above is caught in an inlet of the fuel sucking pipe to block the inlet, such that the sucking of the fuel and the transfer of the fuel to the engine are not appropriately performed.

In the case of the reservoir including the pump, a technology of allowing a filter filtering foreign materials to be included in a pump sucking part, or the like, has been disclosed. However, in the case of a number of vehicles using the reservoir not including the pump, it is difficult to remove these foreign materials or solidification materials. In addition, since the reservoir not including the pump is used due to advantages such as a cheap cost, convenience of maintenance, and the like, a scheme of allowing the filter to be included in the reservoir not including the pump (as in the case of the reservoir including the pump) causes an increases in cost and inconvenience of maintenance, such that it does not solve the above-mentioned problem. In addition, the filter is effective to filter the foreign materials. However, in the case in which the diesel becomes a slush state or the lump is generated due to the freezing of the diesel or the moisture in the diesel, these solidification materials cover the filter over a very wide area, such that flow of the fuel may become more difficult due to the filter. Therefore, it is not preferable to use the filter.

Therefore, a structure allowing fuel to be smoothly transferred particularly at a low temperature, that is, at a point of time in which solidification occurs in the fuel in a reservoir not including a pump has been continuously demanded by those skilled in the art.

SUMMARY

An embodiment of the present invention is directed to providing a reservoir for a fuel tank not including a pump and capable of allowing fuel to be smoothly transferred by effectively blocking a solidification material when solidification occurs in the fuel in a low temperature environment.

In one general aspect, a reservoir for a fuel tank 300 included in the fuel tank 300 includes: a receiving part 110 having a fuel sucking pipe 120 connected thereto and receiving fuel, the fuel sucking pipe 120 supplying the fuel to an engine 200; a supplying part 130 connected to the receiving part 110 to supply the fuel in the fuel tank 300 into the receiving part 110; and a measuring part 140 measuring an amount of the fuel received in the receiving part 110, wherein the fuel sucking pipe 120 includes a fence type structure 150 formed at an inlet side position thereof in order to filter foreign materials including a solidification material in the fuel to thereby prevent the foreign materials from being sucked into the fuel sucking pipe 120.

The fence type structure 150 may have a form in which it is protruded from a bottom surface of the receiving part 110.

The fence type structure 150 may be formed to be extended from the bottom surface of the receiving part 110 up to a height of an inlet of the fuel sucking pipe 120.

The fence type structure 150 may include a plurality of single piece parts disposed radially based on the axis center of the fuel sucking pipe 120, disposed to be spaced apart from each other at predetermined intervals, and each formed of a plate. Here, the single piece part may be formed so that an extension direction of a plate surface thereof is directed toward the axis center of the fuel sucking pipe 120. In addition, the single piece parts may be formed so that a height of the single piece part at a side close to the fuel sucking pipe 120 is higher than that of the single piece part at a side distant from the fuel sucking pipe 120.

The fence type structure 150 may have a form in which it is protruded and extended from an inlet of the fuel sucking pipe 120. Here, the fence type structure 150 may be formed to be extended from the inlet of the fuel sucking pipe 120 to the bottom surface of the receiving part 110.

The fence type structure 150 may be provided with a plurality of holes or include surfaces formed of a lattice.

BRIEF DESCRIPTION OF THE DRAWINGS

FIGS. 3 to 4D are views showing several examples of a fence type structure according to the exemplary embodiment of the present invention.

[Detailed Description of Main Elements]

| | |
|---|---|
| 100: Reservoir | 110: Receiving Part |
| 120: Fuel Sucking pipe | 130: Supplying Part |
| 140: Measuring Part | 150: Fence Type Structure |
| 200: Engine | 300: Fuel Tank |

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a reservoir for a fuel tank according to an exemplary embodiment of the present invention having the above-mentioned configuration will be described in detail with reference to the accompanying drawings.

Figure 1:
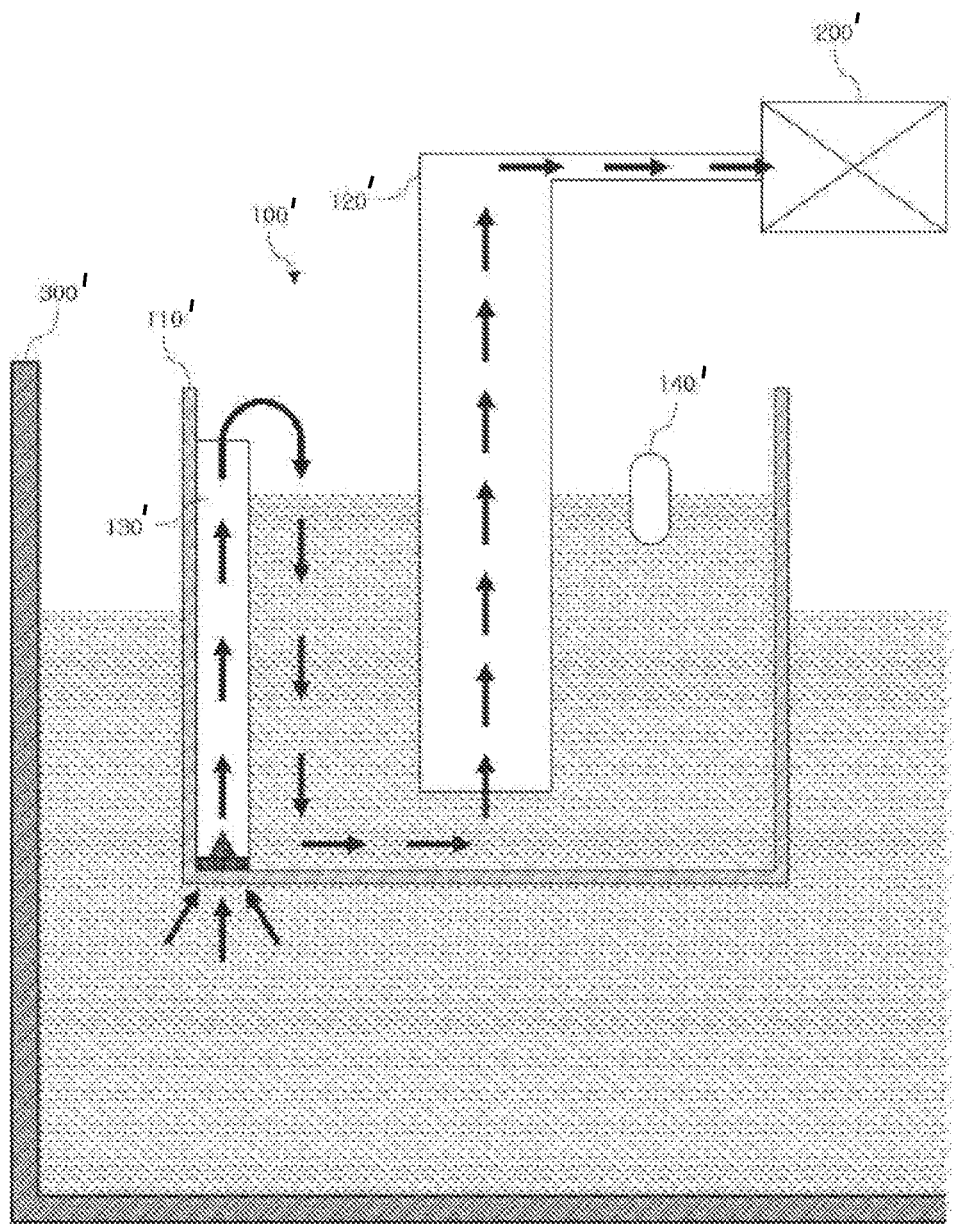
FIG. 1 is a view showing a reservoir for a fuel tank according to the related art.
Figure 2:
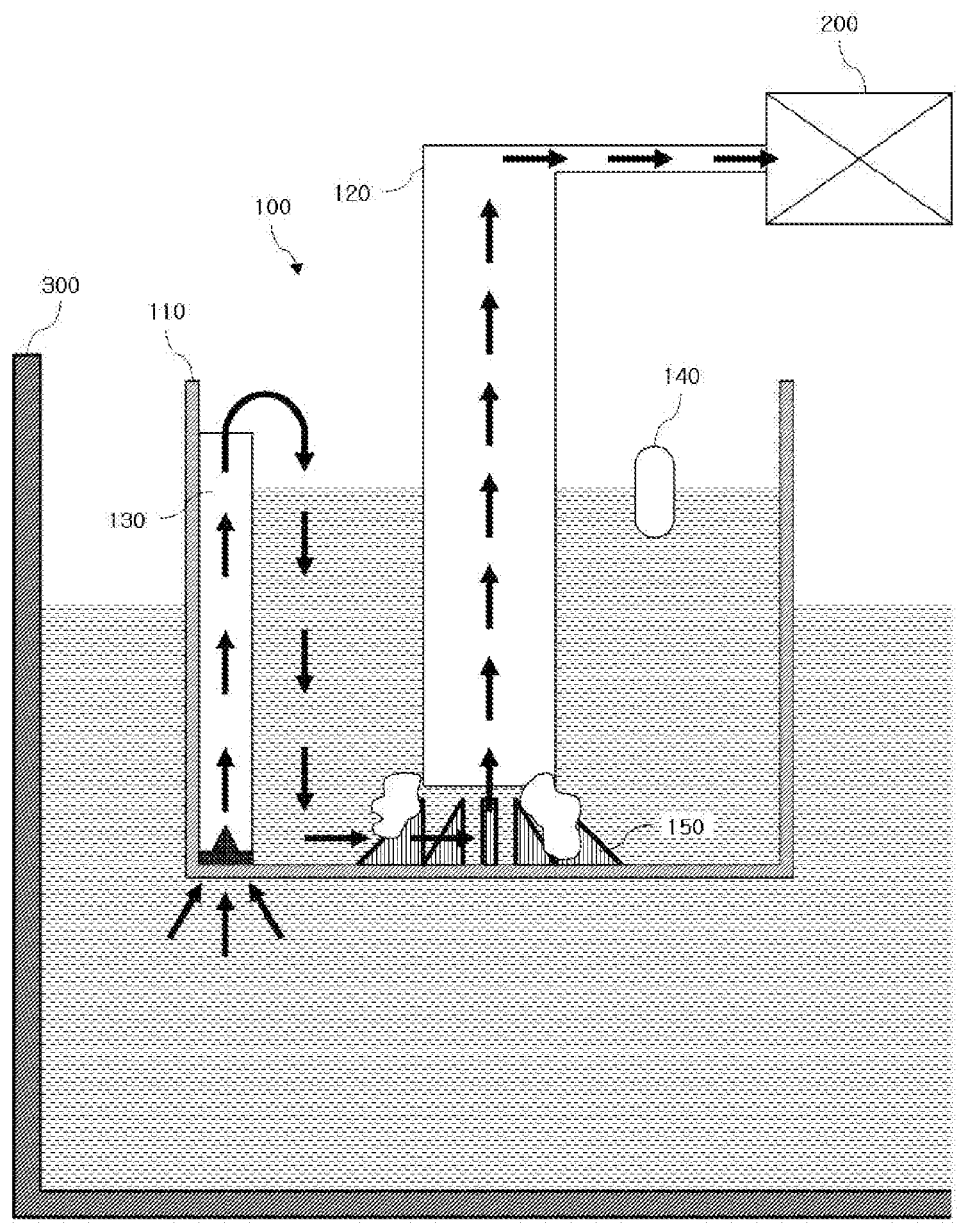
FIG. 2 is a view showing a reservoir for a fuel tank according to an exemplary embodiment of the present invention.

FIG. 2 schematically shows a reservoir for a fuel tank according to an exemplary embodiment of the present invention. The present invention relates to a reservoir not including a pump as described above. The reservoir 100 according to the exemplary embodiment of the present invention, which is a reservoir 100 provided in a fuel tank 300, is configured to include: a receiving part 110 having a fuel sucking pipe 120 connected thereto and receiving fuel, the fuel sucking pipe 120 supplying the fuel to an engine 200; a supplying part 130 connected to the receiving part 110 to supply the fuel in the fuel tank 300 into the receiving part 110; and a measuring part 140 measuring an amount of the fuel received in the receiving part 110, wherein the fuel sucking pipe 120 includes a fence type structure 150 formed at an inlet side position thereof in order to filter foreign materials including a solidification material in the fuel to thereby prevent the foreign materials from being sucked into the fuel sucking pipe 120, as shown in FIG. 2.

The fence type structure 150 is formed in the vicinity of the fuel sucking pipe 120 and catches fuel in a lump or slush state generated due to freezing of fuel itself or moisture in fuel to allow only fuel in a liquid state to be sucked into an inlet of the fuel sucking pipe 120, thereby making it possible to effectively prevent a phenomenon that the fuel sucking pipe 120 is blocked.

The fence type structure 150 simply has a form in which it is protruded from a bottom surface of the receiving part 110 as shown in FIG. 2. Through the above-mentioned configuration, a process of manufacturing the fence type structure 150 in the reservoir 100 may be very easily performed. That is, a shape of the fence type structure 150 is formed in a mold of the receiving part 110, such that the fence type structure 150 may be formed integrally with the receiving part 110. Alternatively, the fence type structure 150 may be formed to be coupled to a bottom of the receiving part 110 during a process of manufacturing the receiving part 110.

Figure 3:
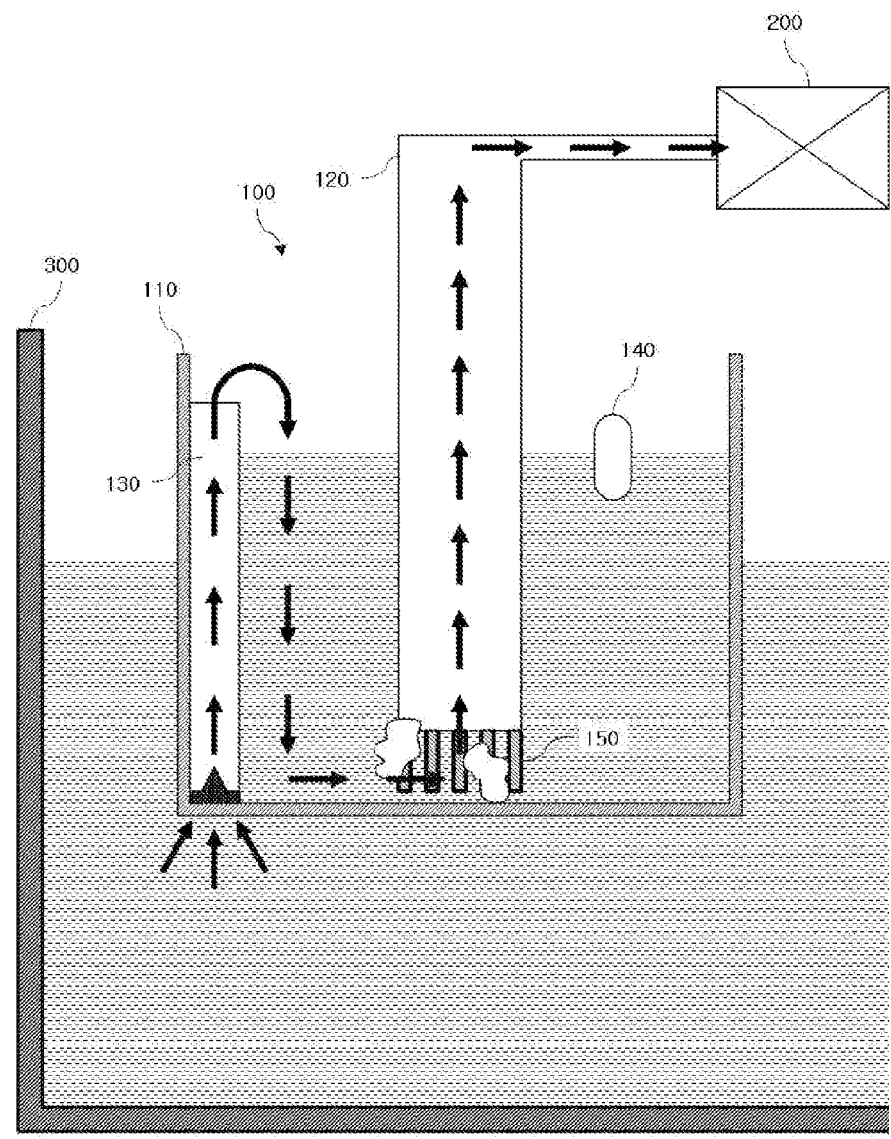

Alternatively, the fence type structure 150 may also have a form in which it is protruded and extended from an inlet of the fuel sucking pipe 120 as shown in FIG. 3. In this case, the fence type structure 150 is also formed integrally with the fuel sucking pipe 120 during a process of manufacturing the fuel sucking pipe 120 or is coupled as a separate component to the fuel sucking pipe 120, such that it may be easily manufactured.

In order for the fence type structure 150 to effectively prevent the inlet of the fuel sucking pipe 120 due to the solidification material in the fuel, in the case in which the fence type structure 150 is protruded from the bottom surface of the receiving part 110 as shown in FIG. 2, it is preferable that the fence type structure 150 is formed to be extended from the bottom surface of the receiving part 110 up to a height of the inlet of the fuel sucking pipe 120. Alternatively, in the case in which the fence type structure 150 is protruded and extended from the inlet of the fuel sucking pipe 120 as shown in FIG. 3, the fence type structure 150 may be formed to be extended from the input of the fuel sucking pipe 120 up to the bottom surface of the receiving part 110.

As described above, the fence type structure 150 is formed to have a simple shape and is significantly effective in catching a solidification material (that is, fuel in a lump or slush state generated due to freezing of fuel itself or moisture in the fuel, or the like) relatively much larger than a particle filtered in a general filter. In the case of filtering this solidification material in the filter, the solidification material covers a significant wide area of the filter to block the filter, such that the fuel is not appropriately sucked into the fuel sucking pipe 120. However, since the fence type structure 150 according to the exemplary embodiment of the present invention is configured to catch large lumps to thereby prevent the large lumps from being lumped unlike the filter, liquid easily escapes between the fence type structures 150, thereby making it possible to effectively prevent a blocking phenomenon.

A specific shape of the fence type structure 150 according to the exemplary embodiment of the present invention will be described in more detail with reference to FIGS. 4A to 4D. In FIGS. 4A to 4D, in order to allow the specific shape of the fence type structure 150 to be viewed in detail, the fence type structure 150 is relatively exaggerated as compared to a real size thereof.

As shown in FIGS. 4A to 4D, the fence type structure 150 may include a plurality of single piece parts each formed of a plate. Here, the single piece parts are disposed radially based on the axis center of the fuel sucking pipe 120 and are disposed to be spaced apart from each other at predetermined intervals, as shown in lower portions of FIGS. 4A and 4B. The solidification material lump may be effectively caught by each single piece part of the fence type structure 150 through the above-mentioned configuration.

Figure 4:
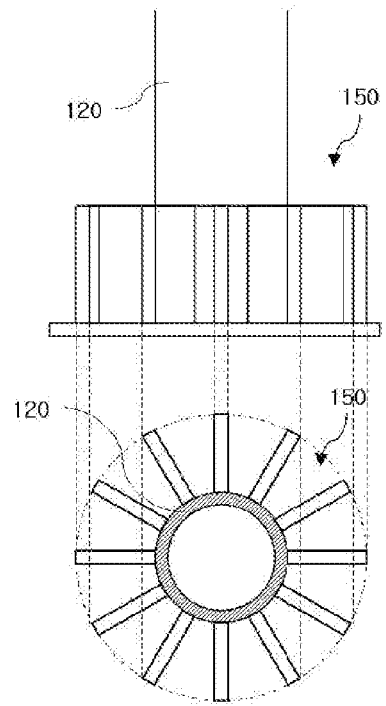
Figure 4:
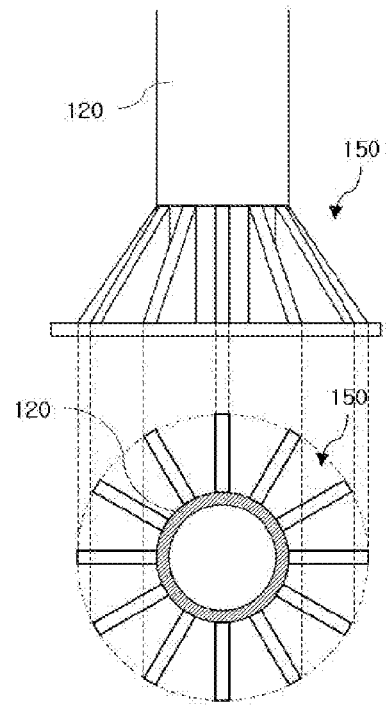
Figure 4:
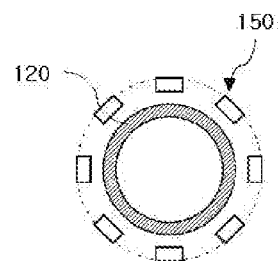
Figure 4:
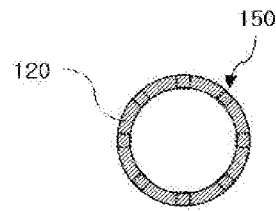

The single piece part may also be disposed so that a plate surface thereof is directed toward the fuel sucking pipe 120 as shown in FIGS. 4C and 4D. Particularly, a form shown in FIG. 4D may be applied to a case in which the fence type structure 150 is coupled to the inlet of the fuel sucking pipe 120 rather than a case in which the fence type structure 150 is coupled to the receiving part 110.

However, in the case in which the fence type structure 150 is disposed as described above, an area of a portion at which the solidification material is caught and a path through which fuel in a liquid state passes are slightly reduced. Therefore, in order to maximize the area of a portion at which the solidification material is caught and the path through which the fuel in a liquid state passes, it is preferable that the single piece part is formed so that an extension direction of the plate surface thereof is directed toward the axis center of the fuel sucking pipe 120, as shown in FIGS. 4A and 4B. Shapes of the single piece parts are not particularly limited. For example, the single piece parts may have a rectangular shape as shown in FIG. 4A. Particularly, as shown in FIG. 4B, the single piece parts are formed so that a height of the single piece part at a side close to the fuel sucking pipe 120 is higher than that of the single piece part at a side distant from the fuel sucking pipe 120, thereby making it possible to allow the liquid fuel to smoothly pass through the fence type structure 150 while effectively preventing the solidification material from blocking the inlet of the fuel sucking pipe 120 and further reduce material and manufacturing costs.

It is preferable that the fence type structure 150 may also be provided with a plurality of holes or include surfaces formed of a lattice in order to allow the liquid fuel to smoothly pass therethrough. This may also be applied to each single piece part in the embodiment in which the fence type structure 150 includes the single piece parts. In this case, the solidification material is caught by a structure of the single piece part. That is, the hole or the lattice is formed in order to pass the fuel therethrough rather than in order to filter the solidification material. Therefore, there is no specific limitation in a size or density of the hole or the lattice.

Alternatively, the fence type structure 150 is provided with the plurality of holes or includes the surfaces formed of the lattice and has the same shape as that of the fuel sucking pipe 120, thereby making it possible to form a cylindrical shape extended from the inlet of the fuel sucking pipe 120 up to the bottom surface of the receiving part 110. In this case, it is preferable that the hole or the lattice of the fence type structure 150 generally has a size relatively much larger than a lattice formed of a material used for a filter in consideration of problems generated in the case in which the solidification material is caught by the filter.

According to the exemplary embodiments of the present invention, in the reservoir included in the fuel tank, particularly, in the reservoir not including the pump, in the case in which the fuel itself becomes a slush state or the lump is generated due to the freezing of the fuel itself or the moisture in the fuel in the lower temperature environment, a phenomenon that these solidification materials block the inlet of the fuel sucking pipe is effectively prevented by the fence type structure according to the exemplary embodiment of the present invention, thereby making it possible to smoothly transfer the fuel from the reservoir to the engine regardless of the temperature environment.

The fence type structure according to the exemplary embodiment of the present invention, which is provided in the reservoir not including the pump, has a very simple structure in the reservoir not including the pump, generally having advantages such as a cheap cost and convenient maintenance as compared to the reservoir including the pump, such that it may be conveniently manufactured and be very easily applied to the reservoir. In addition, since the fence type structure according to the exemplary embodiment of the present invention has a simple structure, it hardly cause an increase in a manufacturing cost and needs not to be separately managed, thereby making it possible to effectively prevent the sucking pipe blocking phenomenon while maintaining the advantages (a cheap cost and convenient maintenance) of the reservoir not including the pump.

The present invention is not limited to the above-mentioned exemplary embodiments but may be variously applied, and may be variously modified by those skilled in the art to which the present invention pertains without departing from the gist of the present invention claimed in the claims.

What is claimed is:

1. A reservoir for a fuel tank included in the fuel tank, the reservoir comprising: a receiving part having a fuel sucking pipe connected thereto and receiving fuel, the fuel sucking pipe supplying the fuel to an engine; a supplying part connected to the receiving part to supply the fuel in the fuel tank into the receiving part; and a measuring part measuring an amount of the fuel received in the receiving part, wherein the fuel sucking pipe a fence type structure formed at an inlet side position thereof in order to filter foreign materials including a solidification material in the fuel to thereby prevent the foreign materials from being introduced into the fuel sucking pipe; and wherein the fence type structure includes a plurality of single piece parts disposed radially based on the axis center of the fuel sucking pipe, disposed to be spaced apart from each other at predetermined intervals, and each formed of a plate.

2. The reservoir of claim 1, wherein the fence type structure has a form in which it is protruded from a bottom surface of the receiving part.

3. The reservoir of claim 2, wherein the fence type structure is formed to be extended from the bottom surface of the receiving part up to a height of an inlet of the fuel sucking pipe.

4. The reservoir of claim 1, wherein the single piece part is formed so that an extension direction of a plate surface thereof is directed toward the axis center of the fuel sucking pipe.

5. The reservoir of claim 1, wherein the single piece parts are formed so that a height of the single piece part at a side close to the fuel sucking pipe is higher than that of the single piece part at a side distant from the fuel sucking pipe.

6. The reservoir of claim 1, wherein the fence type structure has a form in which it is protruded and extended from an inlet of the fuel sucking pipe.

7. The reservoir of claim 6, wherein the fence type structure is formed to be extended from the inlet of the fuel sucking pipe to the bottom surface of the receiving part.

8. The reservoir of claim 1, wherein the fence type structure is provided with a plurality of holes or includes surfaces formed of a lattice.

\* \* \* \* \*

UNITED STATES PATENT AND TRADEMARK OFFICE
CERTIFICATE OF CORRECTION

| | | |
|---|---|---|
| PATENT NO. | : 8,789,515 B2 | Page 1 of 1 |
| APPLICATION NO. | : 13/337204 | |
| DATED | : July 29, 2014 | |
| INVENTOR(S) | : Kusung Kwon | |

It is certified that error appears in the above-identified patent and that said Letters Patent is hereby corrected as shown below:

In the Claims

Column 6, Line 58, Claim 1, after "pipe" insert -- includes --

Signed and Sealed this
Second Day of December, 2014

Michelle K. Lee
*Deputy Director of the United States Patent and Trademark Office*